Figure 1:
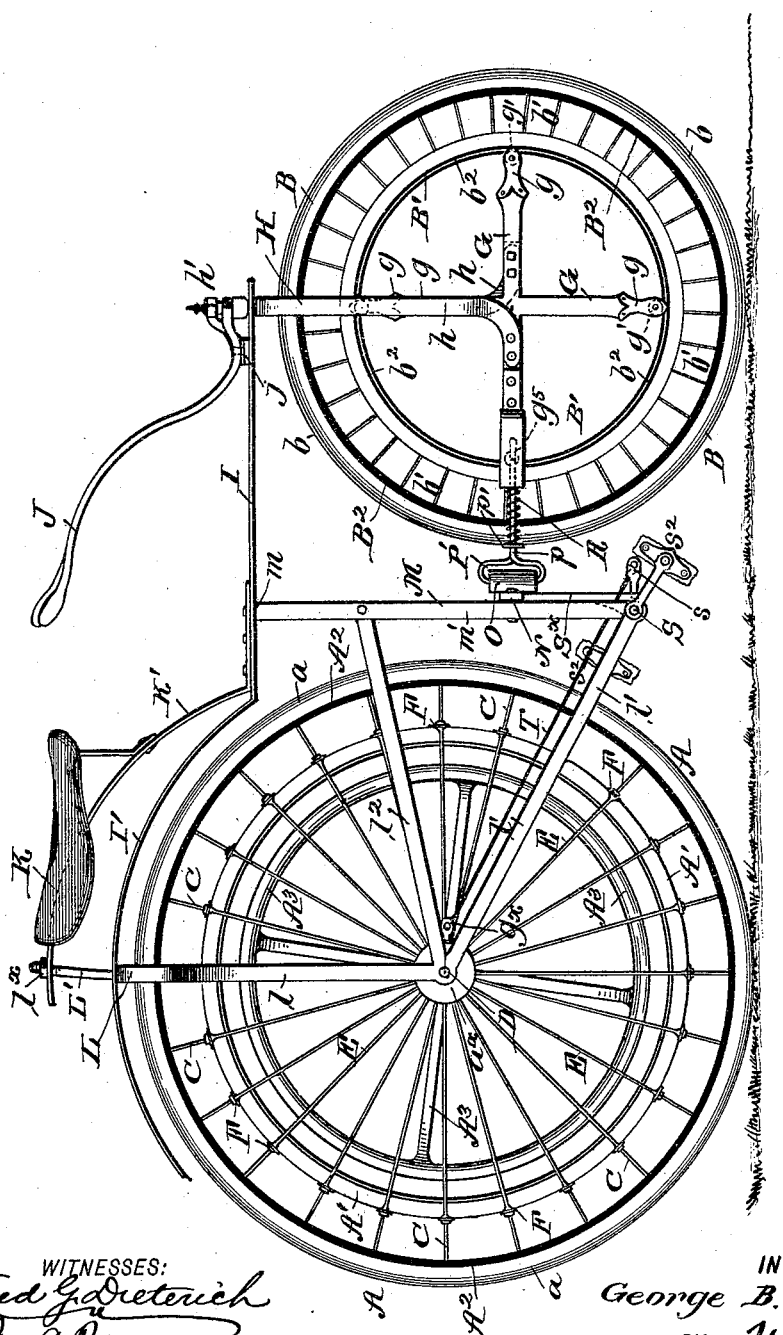

(No Model.) 2 Sheets—Sheet 1.

G. B. THOMAS.
BICYCLE.

No. 543,515. Patented July 30, 1895.

WITNESSES:
Fred G. Dieterich
Jos. A. Ryan

INVENTOR
George B. Thomas
BY Munn & Co.
ATTORNEYS.

(No Model.) 2 Sheets—Sheet 2.
G. B. THOMAS.
BICYCLE.
No. 543,515. Patented July 30, 1895.
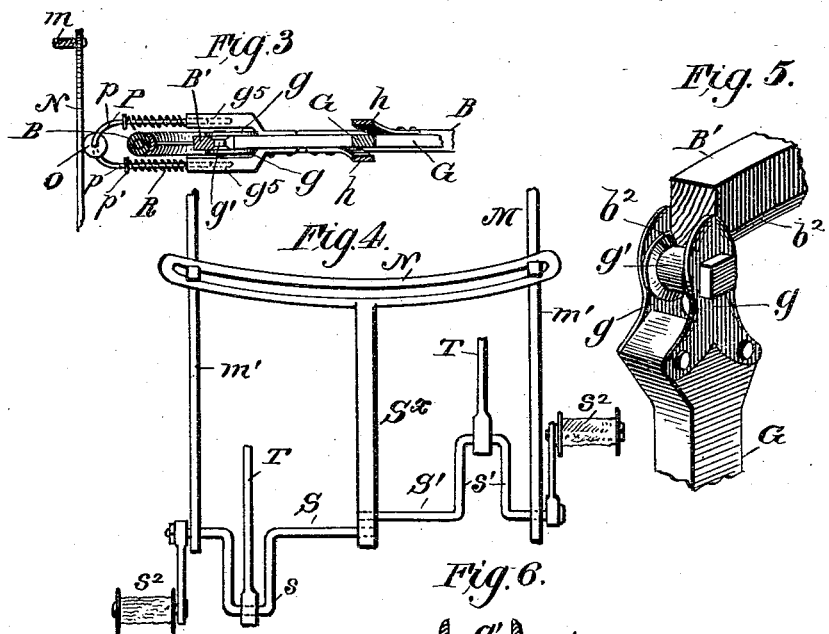
WITNESSES:
Fred G. Dieterich
M. A. Ryan
INVENTOR
George B. Thomas
BY Munn & Co
ATTORNEYS.

UNITED STATES PATENT OFFICE.

GEORGE B. THOMAS, OF DURANGO, COLORADO.

BICYCLE.

SPECIFICATION forming part of Letters Patent No. 543,515, dated July 30, 1895.

Application filed February 7, 1894. Renewed February 15, 1895. Serial No. 538,494. (No model.)

*To all whom it may concern:*

Be it known that I, GEORGE B. THOMAS, residing at Durango, in the county of La Plata and State of Colorado, have invented certain new and useful Improvements in Bicycles, of which the following is a specification.

My invention relates to improvements in bicycles, and it has primarily for its object to provide a machine of this kind in which the several parts of the drive mechanism are so arranged that a greatly increased power and speed is attained from the ordinary treadle-power.

With other objects in view, which hereinafter will be referred to, the invention consists in the peculiar combination and novel arrangement of parts, such as hereinafter will be first described and then pointed out in the appended claims, reference being had to the accompanying drawings, in which—

Figure 1 is a side view of my improved bicycle. Fig. 2 is a horizontal section on the line 2 2, Fig. 1. Fig. 3 is a horizontal section on the line 3 3, Fig. 1. Fig. 4 is a detail front view of the front crank member. Fig. 5 is a detail perspective view of one of the front-wheel bearings hereinafter referred to, and Fig. 6 is a detail sectional view thereof.

Referring to the accompanying drawings, A indicates the rear or drive wheel, and B the front or steering wheel, and such wheels have pneumatic or cushion tires $a$ $b$ of the ordinary construction.

The rear wheel A, which is loosely journaled on the shaft, is formed with a supplemental rim A', which is braced to the outer rim or felly $A^2$ by the stay-rods C C, and to the axle D by the spoke-hubs $a^x$ and spokes E, which spokes connect with short transverse members F secured on the peripheral edge of the rim A', and with the opposite hub members $a^x$ $a^x$, as shown, such arrangement of the spokes providing an internal space in which is held a fly-wheel $A^3$, fixedly journaled on the axle D and connected to the hubs $a^x$ by the members $a^5$, which serves, as the machine is operated, to give additional momentum thereto when in motion.

The front wheel B has an inner rim B', which is braced by the stay-rods $b'$ with the outer rim $B^2$, the inner face of such rim being formed into a bearing-face $b^2$, which seats between projecting or side bearing members $g$ on the outer ends of the horizontal and vertical supporting-arms G and G, in the ends of which are journaled friction-rollers $g'$ $g'$, as clearly shown in Fig. 5.

The arms G G are held rigid and are secured on the lower ends of the side arms $h$ $h$ of the yoke or fork frame H, the upper end of which terminates in a steering-head $h'$, journaled in a main support or bar I, and to such head are secured the handle-arms J J, which are also secured to a spring-bearing plate $j$, which rests and is guided on the main supporting-bar I, such handles extending up within convenient reach of the seat K.

It will be noticed by reference to Fig. 1 the bar I extends rearward and curves up over the rear wheel to form the backbone I', and such bar is supported at the rear end on a rear frame formed of the yoke member L, the vertical side arms $l$ $l$ of which extend to each side of the rear wheel and form bearings for the ends of the axle D, and terminate in forwardly-extending and downwardly-inclined members $l'$ $l'$, the front ends of which are bolted to or formed integral with the lower ends of a front yoke-frame M, disposed between the wheels, and forming at its upper end a bearing $m$ for the supporting-bar I, as shown, and such yoke-frame M is further braced to the rear frame L by the upwardly-inclined brace-arms $l^2$ $l^2$.

The seat K is mounted on a seat-rest formed of a spring member K' secured at its lower end to the bar I, while its rear end is guided and held in proper position by the yoke-bolt L', and nut $l^x$, which extends through the backbone, as shown.

Referring now more particularly to Fig. 3, it will be seen the side arms $m'$ $m'$ of the front yoke-frame are connected by a horizontal cross-piece N, which forms a guide for a yielding bearing in the nature of a roller O, journaled in a twisted loop P', the arms $p$ $p$ of which seat and have longitudinal movement in sockets $g^5$ $g^5$, formed on the inner end of the horizontal member G, such roller O being normally held out in contact with the guide N by the spiral springs R R, disposed about such arms $p$, between a stud or shoulder $p'$ and the face of the socket.

$S^x$ indicates a central bearing or pendent post secured to or formed with the crosspiece N, in which and the lower ends of the arms $m'$ $m'$ is journaled the treadle crankshaft, which in the construction shown is formed of two independent members S S', having oppositely-projecting crank portions $s$ $s'$, and provided at their outer ends with treadles $s^2$ $s^2$, the inner ends of the members S S', being journaled in the central bearing $S^x$, as shown.

The main axle G has a pair of oppositely-projected crank members $g^x$ $g^x$, which are connected with the cranks $s$ $s'$ by means of the pitman-rods T T.

By constructing a bicycle in the manner described, a greatly increased power is attained, as the crank motion is more directly and uniformly distributed at each side of the drive-wheel. Furthermore, by providing a divided treadle-axle, the same will be held from any undue twist strain, and by forming the front wheel with a supplemental bearing rim held on equidistant roller-bearings the weight or strain on the rim will be more evenly distributed, it being also the more readily guided and held to its desired positions and the front supporting-frame braced by means of yielding bearing members J.

Having thus described my invention, what I claim, and desire to secure by Letters Patent, is—

1. In a bicycle, the combination with the main wheel, and frame, and a transverse horizontal guide held in front of the rear wheel, of the steering head, and frame, the front wheel journaled thereon, and a spring actuated roller, and holding frame, secured on the steering frame and adapted to engage the aforesaid guide, all substantially as shown and described.

2. An improved bicycle, consisting of a main frame, including a spring bar or seat rest, said main frame having front and rear yoke portions, the main wheel journaled in the rear yoke portion, having its axle formed with crank portions, the pedal axle journaled in the lower end of the front yoke portion having crank portions, connected by pitmen with the main axle cranks, a horizontal guide on such front yoke, a steering head, a supporting bar connecting such head and main frame, a front yoke frame connected to such head, a front wheel journaled in such front yoke frame, said frame having a yielding presser portion engaging the horizontal guide all arranged substantially as shown and for the purposes described.

GEORGE B. THOMAS.

Witnesses:
CHARLES NAEGELIN,
RICHARD MCCLOUD.